US008366991B2

(12) United States Patent
Yamada et al.

(10) Patent No.: US 8,366,991 B2
(45) Date of Patent: Feb. 5, 2013

(54) APPARATUS FOR RECOVERING PLATINUM GROUP ELEMENTS

(75) Inventors: Koji Yamada, Odate (JP); Masahiko Ogino, Kosaka-machi (JP); Nobuyasu Ezawa, Ageo (JP); Hiroshi Inoue, Tokyo (JP)

(73) Assignees: Dowa Metals & Mining Co., Ltd., Tokyo (JP); Tanaka Kikinzoku Kogyo K.K., Tokyo (JP); Kosaka Smelting & Refining Co., Ltd., Tokyo (JP); Nippon PGM Co., Ltd., Tokyo (JP)

( * ) Notice: Subject to any disclaimer, the term of this patent is extended or adjusted under 35 U.S.C. 154(b) by 223 days.

(21) Appl. No.: 12/883,729

(22) Filed: Sep. 16, 2010

(65) Prior Publication Data
US 2011/0001279 A1  Jan. 6, 2011

Related U.S. Application Data

(62) Division of application No. 10/521,818, filed as application No. PCT/JP03/09876 on Aug. 4, 2003, now Pat. No. 7,815,706.

(30) Foreign Application Priority Data

Aug. 5, 2002 (JP) .................................. 2002-227847

(51) Int. Cl.
*C21B 7/00* (2006.01)
(52) U.S. Cl. ......................... 266/216; 266/236; 266/242

(58) Field of Classification Search .................. 266/216, 266/242, 236
See application file for complete search history.

(56) References Cited

U.S. PATENT DOCUMENTS

| 2,744,944 | A | * | 5/1956 | Hardin et al. .................. 373/71 |
| 3,936,588 | A | * | 2/1976 | Asphaug et al. ................ 373/81 |
| 4,060,409 | A | * | 11/1977 | Ammann et al. ............. 75/10.35 |
| 4,537,551 | A | * | 8/1985 | Krogsrud ...................... 414/199 |
| 4,870,655 | A | * | 9/1989 | Ward .............................. 373/60 |
| 5,252,305 | A | | 10/1993 | Ezawa et al. |
| 5,735,933 | A | | 4/1998 | Yokoyama et al. |
| 6,699,302 | B1 | | 3/2004 | Jones et al. |

FOREIGN PATENT DOCUMENTS

| JP | 4-317423 | 11/1992 |
| JP | 7-243080 | 9/1995 |
| JP | 8-325649 | 12/1996 |
| JP | 2000-248322 | 9/2000 |
| JP | 2002-30357 | 1/2002 |

* cited by examiner

*Primary Examiner* — Scott Kastler
(74) *Attorney, Agent, or Firm* — Clark & Brody

(57) ABSTRACT

An apparatus for recovering platinum group elements comprises a furnace body having an interior space substantially shot off from external air, a material charging port and an exhaust port provided in an upper half of the furnace body, at least two fluid discharge ports provided in a lower half of the furnace body at different height levels. a material charging chute connected to the material charging port. an exhaust unit connected to the exhaust port; and electrodes for passing electric current through and heating material charged into the furnace. The material charging chute is equipped with a vertical two stage shutter so as to maintain airtightness when material is charged into the interior space of the furnace.

3 Claims, 2 Drawing Sheets

APPARATUS FOR RECOVERING PLATINUM GROUP ELEMENTS

This application is a Divisional of U.S. patent application Ser. No. 10/521,818 now U.S. Pat. No. 7,815,706, filed Jan. 21, 2005, which is the national stage of International Application Number PCT/JP2003/009876, filed Aug. 4, 2003, not published in English, and claims priority of Japanese Patent Application No. 2002-227847, filed Aug. 5, 2002.

TECHNICAL FIELD

This invention relates to a method for recovering platinum group elements from a substance containing at least one platinum group element, such as spent petrochemical type catalyst, spent vehicle exhaust gas purification catalyst, and spent electronic circuit boards or lead frames.

BACKGROUND ART

Conventional methods for recovering platinum group elements from spent vehicle exhaust gas purification catalysts (ceramic carrier catalysts, metal carrier catalysts and the like from exhaust gas converters, which will be collectively called "discarded vehicle-use catalysts") include, for example, the method of extracting platinum group elements from a solution obtained by adding an oxidizing agent to aqua regia or the method of, conversely, dissolving the carrier in sulfuric acid or the like and separating the undissolved platinum group elements. However, such wet methods have been found to be impractical owing to inferior platinum group element extraction rate and to recovery and cost problems caused by, for instance, the use of large amounts of acid for dissolving the carrier.

In contrast, the methods taught by applicant's JP-H4-317423A and JP-2000-248322A conduct distinctive dry processing in which platinum group elements are transferred into molten metal (molten copper metal) by melting a discarded vehicle-use catalyst or other platinum group element-containing substance together with a copper-containing material (copper oxide and/or metallic copper) in a furnace. When these methods are combined with an enrichment process in which the molten metal containing the platinum group elements obtained in this manner is oxidized and then separated into a molten oxide phase and a molten metal phase of enhanced platinum group element concentration, the platinum group elements can be recovered at a high recovery rate and low cost, thus offering an economical resource recovery method with advantages not possessed by wet methods.

Problems to be Overcome by the Invention

The aforesaid dry recovery method that transfers the platinum group elements into the aforesaid molten metal is a very good method from the points of high recovery rate and low cost. In the melting operation, however, a certain amount of settling time is required for thoroughly transferring the platinum group elements to the molten metal. Specifically, when the discarded vehicle-use catalyst or other such platinum group element-containing substance and the copper source material are charged into an electric furnace while still in a solid state, in order to transfer the platinum group elements into the molten metal in the course of their meltdown it is necessary at the stage when phase separation between the slag and metal occurs to determine the time at which the platinum group elements can transfer to the metal side, and whether or not the transfer has fully occurred is hard to judge. Therefore, to be on the safe side, it has been necessary to set a relatively long settling time (standing time). In addition, since the condition in the furnace changes every time material is charged, the time for thorough transfer of the platinum group elements into the molten metal may be missed.

In light of these circumstances, it has been necessary for achieving efficient transfer of the platinum group elements into the molten metal to implement appropriate measures after analyzing the behavior of the melt. The present invention addresses this need and has as its object to offer an improvement that enables efficient and stable transfer of platinum group elements to the molten metal side even when the settling time in the aforesaid dry recovery method is made short.

DISCLOSURE OF THE INVENTION

In accordance with the present invention accomplished for achieving the foregoing object, there is provided a method for recovering platinum group elements comprising: charging into a closed electric furnace and melting, together with flux components and a reducing agent, a platinum group element-containing substance to be processed and a copper source material containing copper oxide, sinking molten metal of primarily metallic copper below a molten slag layer of primarily oxides, and enriching the platinum group elements in the molten metal sunk below, which method for recovering platinum group elements is characterized in that molten slag whose copper content has decreased to 3.0 wt % or less is discharged from the electric furnace. In this method, the copper source material charged into the electric furnace is preferably composed of granules of an average grain diameter of not less than 0.1 mm and not greater than 10 mm, and the interior of the electric furnace is preferably maintained at a pressure lower than atmospheric pressure from the melting of the charge material to the discharging of the molten slag.

In accordance with the present invention there is further provided a dry method for recovering platinum group elements comprising: charging into a closed electric furnace and melting, together with flux components and a reducing agent, a platinum group element-containing substance to be processed and a copper source material containing copper oxide, sinking molten metal of primarily metallic copper below a molten slag layer of primarily oxides, enriching the platinum group elements in the molten metal sunk below, separating the molten metal enriched in the platinum group elements from the molten slag and transferring it to a separate furnace while still in the molten state, oxidizing the molten metal in the separate furnace to separate it into a slag layer of primarily oxides and a molten metal layer further enriched in the platinum group elements, which method for recovering platinum group elements is characterized in that molten slag whose copper content has decreased to 3.0 wt % or less is discharged from the electric furnace and the molten slag generated in the separate furnace is water-cooled from a high-temperature state to obtain a copper source material containing the aforesaid copper oxide composed of granules having a grain diameter of not less than 0.1 mm and not greater than 10 mm.

As an apparatus suitable for implementing the method for recovering platinum group elements, the present invention provides an apparatus for recovering platinum group elements comprising: a furnace body having an interior space substantially shut off from external air, a material charging port and an exhaust port provided in the upper half of the furnace body, at least two fluid discharge ports provided in the lower half of the furnace body at different height levels, a material charging chute connected to the material charging port, an exhaust unit connected to the exhaust port, and electrodes for passing electric current through and heating material charged into the furnace, wherein charged material including oxide-based starting material entraining at least one platinum group element, copper oxide, solid reducing agent and flux is melted in the furnace under a reducing atmosphere substantially shut off from external air while operating the exhaust unit to discharge gas generated in the furnace, metallic fluid of high platinum group element concentration is taken out from the low-level fluid discharge port and slag-like fluid of low platinum group element concentration is taken out from the high-level fluid discharge port.

PREFERRED EMBODIMENTS OF THE INVENTION

The "platinum group element-containing substance to be processed" as termed with respect to the present invention is, for example, typically a spent and discarded petrochemical type catalyst containing platinum, palladium and the like or a spent and discarded vehicle exhaust gas purification catalyst containing platinum, palladium and optionally rhodium and the like, but also includes rejected products, scrap and the like occurring in the process of manufacturing such catalysts, as well as used electronic circuit boards, dental products, lead frames and the like that contain palladium and the like. Such substances for processing that contain at least one platinum group element are ordinarily in a form of having a small amount of platinum group elements carried on a metal oxide or ceramic.

The method of the present invention is basically constituted of the steps of charging into an electric furnace and melting so-defined substances for processing that contain at least one platinum group element, together with a copper source material containing copper oxide, a flux and a carbonaceous reducing agent, sinking a molten metal layer of primarily metallic copper below a formed molten slag layer of primarily oxides, and enriching the platinum group elements in the molten metal sunk below. At this time, the present invention adopts a distinctive process wherein:
1. A closed electric furnace is used as the electric furnace,
2. Molten slag whose copper content has decreased to 3.0 wt % or less, preferably 2.0 wt %, is discharged from the electric furnace,
3. Granular material of a grain diameter of not less than 0.1 mm and not greater than 10 mm is used as the copper source material containing copper oxide charged into the electric furnace, and
4. The internal pressure of the electric furnace is maintained lower than atmospheric pressure from the melting of the charge material to the discharging of the molten slag.

These points specified by the present invention will now be explained.

Figure 1:
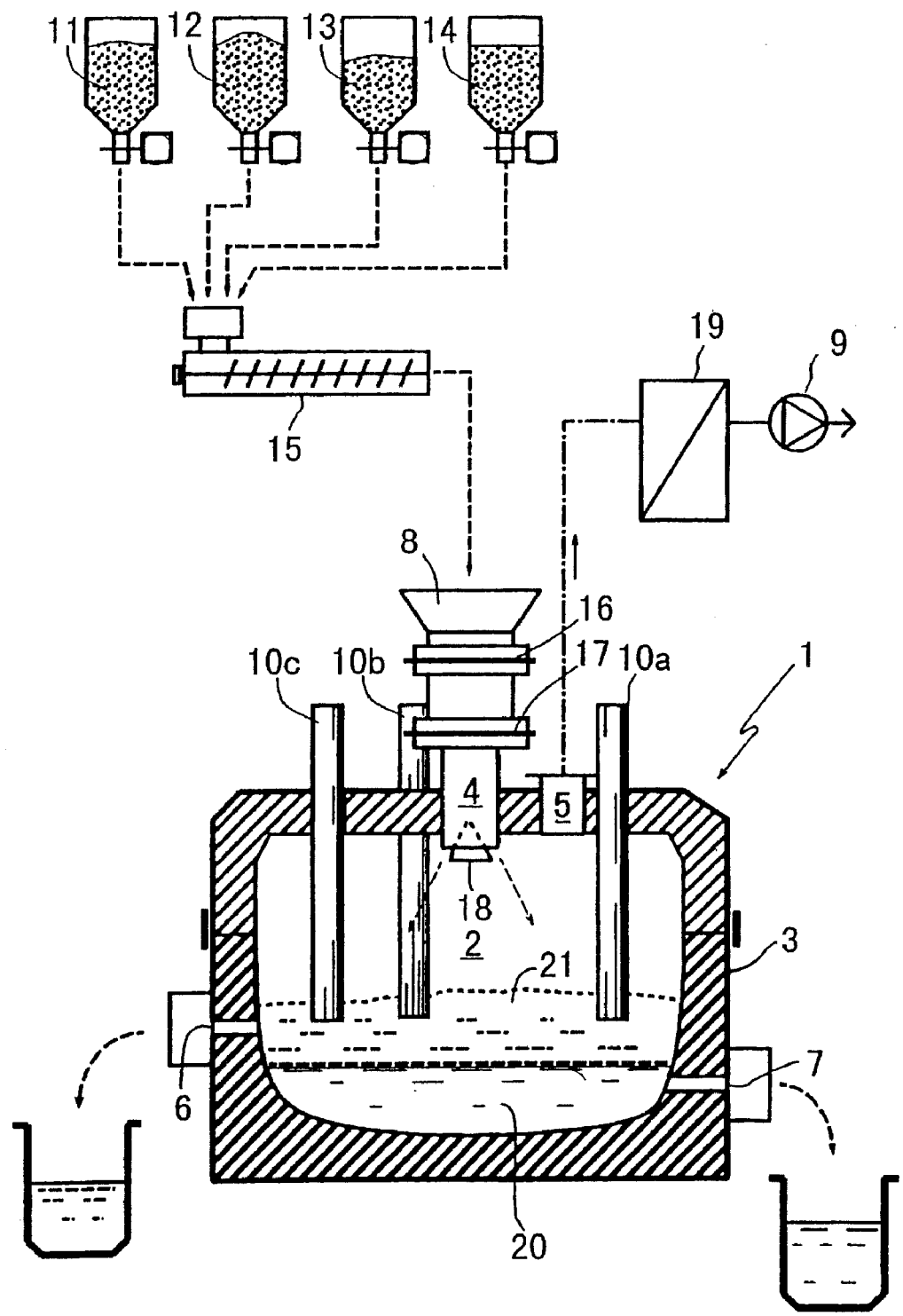
FIG. 1 is a simplified sectional view showing an example of an apparatus for implementing the method of the present invention.

FIG. 1 shows and example of apparatus for implementing the present invention. In FIG. 1, 1 designates a closed electric furnace constituting the main portion of the invention apparatus. The closed electric furnace 1 comprises a furnace body 3 having an internal furnace space 2 substantially shut off from external air, a material charging port 4 and an exhaust port 5 provided in the upper half of the furnace body 3, at least two fluid discharge ports 6 and 7 provided in the lower half of the furnace body at different height levels, a material charging chute 8 connected to the material charging port 4, an exhaust unit 9 connected to the exhaust port 5, and electrodes 10a, 10b, 10c for passing electric current through and heating material charged into the furnace.

The illustrated furnace body 3 has a round internal wall lined with refractory material. The material charging chute 8 is located at substantially the center of the ceiling of the furnace body 3 and the three electrodes 10a, 10b, 10c are installed vertically from the ceiling to be equally spaced on a circle whose center coincides with the center of the material charging chute 8. In other words, the points at which the vertical electrodes 10a, 10b, 10c are located are the apices of an equilateral triangle and the material charging chute 8 is located substantially at the center of this equilateral triangle.

The closed electric furnace 1 constituted in this manner is charged with a mixture of a granular substance to be treated 11 containing at least one platinum group element, a granular copper source material 12 containing copper oxide, a solid reducing agent (powdery coke) 13 and powdery flux 14. Specifically, these charged starting materials are dispensed in measured amounts from their respective hoppers and fed into the material charging chute 8 while being conveyed into the electric furnace 1 with mixing by a screw conveyor 15. The material charging chute 8 is equipped with vertical two-stage shutters 16 and 17 so as to maintain airtightness when material is charged into the furnace. First, a single batch of the material is charged into the material charging chute 8 with the upper stage shutter 16 open and the lower stage shutter 17 closed, whereafter the upper stage shutter 16 is closed and the lower stage shutter 17 is opened to charge the batch resident in the chute 8 into the furnace. When the charging of the batch into the furnace has been completed, the upper and lower shutters 16 and 17 are closed in preparation for the next charging operation. In the illustrated equipment, a diverging member 18 is installed at the lower extremity (below the material charging port 4) of the material charging chute 8 so that the material falling into the furnace from the material charging chute 8 lands near the sides of the triangle connecting the three electrodes 10a, 10b, 10c, preferably near the middle of each of the three sides. As this causes newly charged material to accumulate at the shortest distance connecting the electrodes 10a, 10b, 10c, it enhances the melting efficiency.

At the start of operation of the furnace charged with new material, the at least two fluid discharge ports 6 and 7 provided in the lower half of the furnace body 3 at different height levels are both closed. The material charged into the furnace starts to melt when current is supplied to the electrodes 10a, 10b, 10c. The exhaust gas generated in the furnace in the course of the melting is drawn out through the exhaust port 5 to a dust remover 19 by driving the exhaust unit 9 and the treated exhaust gas is discharged outside the system. The exhaust unit 9 is continuously operated to maintain the internal furnace space 2, which is substantially shut off from external air, at a pressure lower than atmospheric pressure.

When the material charged into the furnace starts to melt, the metal oxides, particularly the copper oxide in the copper source material, is reduced to metallic copper by the reducing agent (powdery coke), thereby generating molten metallic copper. This molten metallic material is heavier than the molten oxide material (slag) and therefore sinks through the slag to settle at the lower part of the furnace, where it forms a pool 20 of molten metal. Molten oxide material, namely, a slag layer 21, forms on the molten metal 20.

As the melt of metallic metal produced by reduction of copper oxide goes down through the slag, it takes in platinum group elements present in the slag. That is, it dissolves them. As a result, platinum group elements collect in the molten metal 20 in a dissolved state to afford molten metal 20 of high platinum group element concentration. On the other hand, the concentration of platinum group elements in the slag 21 declines in proportion to the amount of platinum group elements dissolved into the molten metal 20. Therefore, when the slag 21 whose platinum group element concentration has become low is discharged to the outside from the higher level fluid discharge port 6 and the molten metal 20 high in platinum group element concentration is discharged to the outside from the lower level fluid discharge port 7 while the two are being separated from each other, it becomes possible to harvest molten metal high in platinum group element concentration (metal containing platinum group elements dissolved in metallic copper).

By carrying out this platinum group element recovery using the closed electric furnace 1 in this manner, it is possible to achieve transfer of platinum group elements to the molten metal side while maintaining a reducing atmosphere in the furnace and realizing high thermal efficiency. As a result, the processing period can be shortened and the platinum group element recovery rate improved.

Another feature of the present invention is the point that when recovery of platinum group elements is conducted using such a closed electric furnace, molten slag whose copper content has decreased to 3.0 wt % or less is discharged from the electric furnace. As indicated in the working examples set out below, it was found that when about 0.3 ton of @copper oxide is used per 1 ton of the platinum group element-containing substance to be processed and the molten reduction is conducted in the closed electric furnace using a starting material blended to incorporate enough reducing agent to completely reduce the copper oxide (one ton of flux component also being incorporated), the amount of platinum group elements remaining in the slag is closely related to the amount of copper remaining in the slag. This relationship is shown in FIG. 2.

Figure 2:
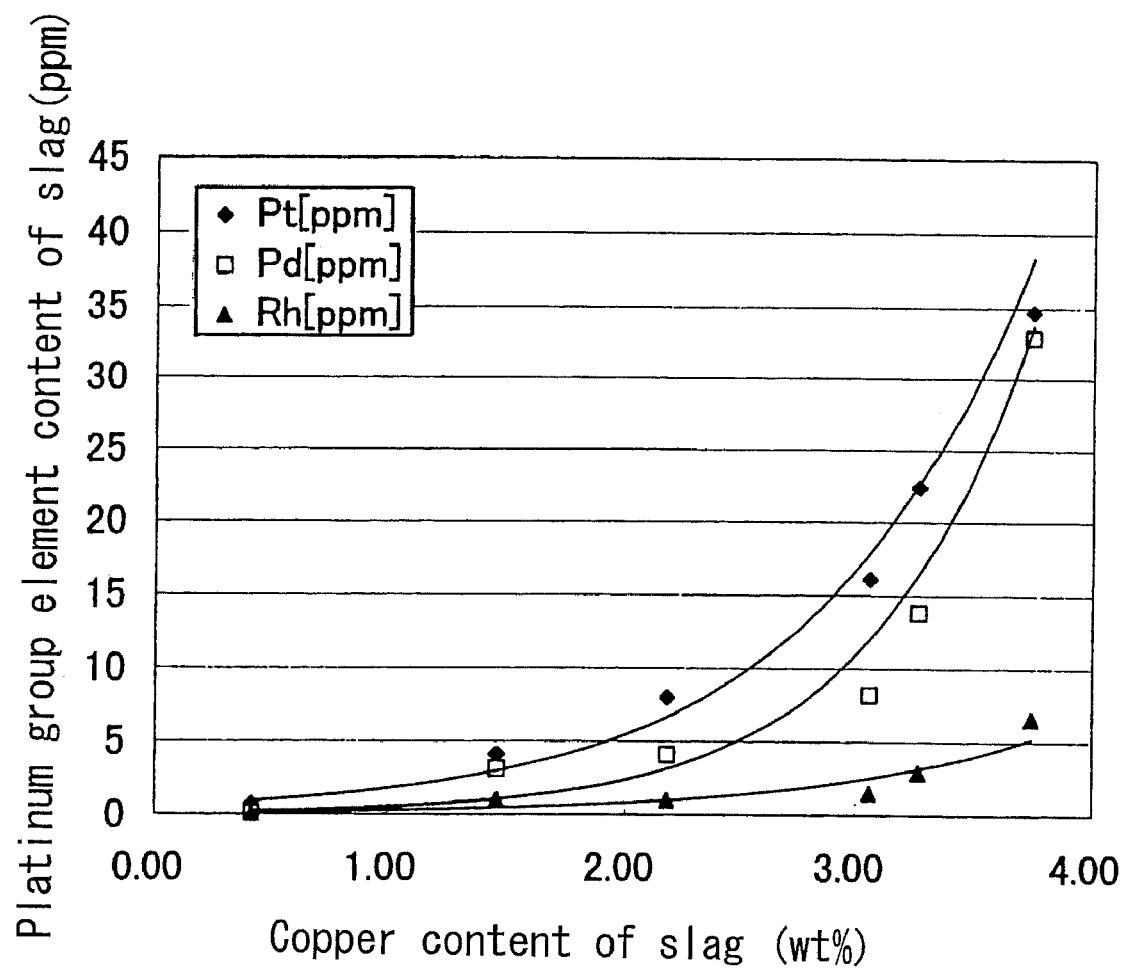
FIG. 2 is a graph showing the relationship between copper content and platinum group element content of slag when the present invention is implemented.

As can be seen in FIG. 2, when the Cu content of the slag is 1 wt %, for example, the Pt, Pd and Rh contents of the slag fall to as low as about 5 ppm, 3 ppm and 1 ppm, respectively, and with further decline of the Cu content, the Pt, Pd and Rh contents all also tend to decrease still more. However, in the region of a Cu content exceeding 3.0 wt %, the contents of all of Pt, Pd and Rh tend to increase sharply, so that the platinum group element recovery rate decreases rapidly.

The molted slag discharged from the electric furnace therefore preferably has its copper content reduced to 3.0 wt % or less, preferably 2.0 wt % or less. The copper content of the molten slag can be ascertained in real time by sampling and analyzing the slag in the furnace during operation using appropriate instrumentation.

When the amount of molten slag increases and the excess needs to be discharged to the exterior in the course of conducting the invention method, it is preferable to measure the copper content of the slag, and if it exceeds 3.0 wt %, to not conduct the discharge operation but to allow the contents of the furnace to stand under a prescribed temperature condition. During the standing period, the copper content of the slag will gradually decline, with an accompanying transfer of the platinum group elements in the slag to the molten metal side.

In this way, outflow of platinum group elements together with discharged slag can be avoided even when discharging slag of low copper content to the outside and, as a result, molten metal of high platinum group element concentration can be recovered.

Still another feature of the present invention is in the point that granular material of an average grain diameter of not less than 0.1 mm and not greater than 10 mm is used as the copper source material containing copper oxide charged into the electric furnace. It was found that when granular material of an average grain diameter of not less than 0.1 mm and not greater than 10 mm is used as the copper source material, platinum group elements in the substance to be processed readily transfer to the molten metal side at the stage when the copper source material is heated and melted. It is particularly preferable for gains of a diameter of not less than 0.1 mm and not greater than 10 mm to account for 50 wt % or more of the copper source material. When this condition is met, the remainder of the copper source material may be lumps of a diameter of 10 mm or greater and, depending on the circumstances, may include powder of a grain diameter below 0.1 mm.

For optimum miscibility of the platinum group element-containing substance to be processed and the copper source material, it too should preferably be composed of granular material 50 wt % or more of which has a grain diameter of not greater than 10 mm. When a substance to be processed and a copper source material both constituted of granular material of an appropriate granularity are charged into the furnace in a state mixed together with a carbonaceous reducing agent and flux, the copper oxide in the copper source material is readily melted and reduced and the copper of the generated molten metal has many occasions to make contact with nearby platinum group elements in the substance to be processed. A large amount of the platinum group elements are therefore taken in by the molten metallic copper.

The flux is preferably simultaneously added to the charged starting materials in order to promote meltdown of the substance to be processed and the copper source material and to enhance the fluidity of the generated slag. As the flux, there is preferably used one obtained by mixing silica, calcium oxide, calcium carbonate and the like in appropriate proportions. Although the mixing ratio of the flux components differs depending on the constituent materials, the flux components are preferably mixed into the charged starting materials so that the flux composition after heating and melting becomes $Al_2O_3$:20-40 wt %, $SiO_2$:25-35 wt %, CaO:20-30 wt % and FeO:5-30 wt %.

Although coke is preferably incorporated as the reducing agent for reducing the copper oxide in the copper source to produce the molten metal composed of metallic copper, it is possible to use, instead of coke, a base metal containing a valuable metal with reducing activity, a resin-system material serving as a carbon source, activated carbon or the like. Any valuable metal (noble metal or platinum group element) contained in these reducing agents can be simultaneously recovered by the method of the present invention.

At the time of utilizing the present invention, a mixture of the substance to be processed, copper source material, flux and reducing agent is charged into the closed electric furnace, the mixture is heated and melted at a temperature of 1100° C.-1700° C., more preferably 1300° C.-1500° C., while maintaining the pressure in the furnace slightly below atmospheric pressure, the oxides in the charged material are melted, and the copper oxide in the charged material is reduced. At a heating/melting temperature below 1100° C., the slag does not assume a totally molten state and its high viscosity is liable to lower the platinum group element recovery rate. At a temperature above 1700° C., energy is wasted and the body of the electric furnace may be damaged. The maintenance of a reduced pressure in the furnace helps to maintain the reducing atmosphere, enable the reduction of the copper oxide to copper to proceed satisfactorily, and increase the efficiency of incorporation of the platinum group elements into the molten metal.

When the charged material is in the melted-down condition, most of the substance to be processed takes the form of a vitreous molten oxide layer (slag layer), and the copper oxide is reduced to molten metallic copper by the reducing agent. Owing to the difference in specific gravity between the two, they spontaneously separate into two layers, i.e., an upper slag layer and a lower molten metal layer. The platinum group elements in the processed material migrate to and are absorbed by the lower molten metal layer at this time. However, as was pointed out earlier, the grain diameter of the copper source material has a major effect on shortening the settling time and improving the rate of absorption of platinum group elements by the molten metal layer. The effect of producing these improvements is strongly manifested when the grain diameter of the copper source material is not less than 0.1 mm and not greater than 10 mm.

While the reason for this is not altogether clear, it is reasonable to conclude as follows. The platinum group elements in the substance to be processed are dispersed into the slag of suitable viscosity at the time the substance to be processed melts down together with the flux. As soon as the simultaneously added copper oxide is reduced, the resulting molten metal is also dispersed into the slag, where, in the course of going down through the slag layer, it absorbs platinum group elements dispersed and floating in the slag of appropriate viscosity. The inventors have named this platinum group element absorbing behavior of the molten metal (copper metal) the "copper showering effect." When the grain diameter of the initially charged copper source material is less than 0.1 mm, the molten metallic copper dispersed in the slag is also of small particle diameter and therefore takes a long time to sink to the lower metal layer. The copper showering effect is therefore not strongly manifested. On the other hand, when the initially charged copper source material is lumpy material of a grain diameter greater than 10 mm, the molten metallic copper sinks to the lower metal layer before thoroughly absorbing the platinum group elements dispersed in the slag. The copper showering effect is not strongly manifested in this case either. Further, in order for the platinum group elements dispersed in the slag to be absorbed in the descending molten metallic copper, the molten metallic copper must have suitable surface area and cross-sectional area. Specifically, at any given weight of the copper source material, the absorption efficiency increases in proportion as the surface area and cross-sectional area are larger. It is considered that it is for these reasons that the copper showering effect is produced most efficiently and the transfer of platinum group elements from the melted-down substance being processed to the molten metal occurs best when the grain diameter of the initially charged copper source material is not less than 0.1 mm and not greater than 10 mm.

In the experience of the inventors, no practical problem regarding platinum group element recovery arises insofar as 50 wt %, preferably 80 wt %, of the copper source material has a grain diameter within this range, and when less than 50 wt % has this grain diameter, it becomes necessary to extend the standing period (settling period) in order to boost the platinum group element recovery rate. By "standing" or "settling" is meant to continue supplying electric current for maintaining the prescribed temperature of the slag already melted following charging of the material into the electric furnace. During the standing or settling, it is preferable to maintain the internal pressure of the closed electric furnace at the reduced level.

After the standing, and at the time point when the copper content of the upper slag layer becomes 3.0 wt % or less, most of the slag is, as explained earlier, discharged to the exterior of the furnace, the remainder being left inside the furnace. The molten metal layer that has absorbed platinum group elements and is present at the lower part of the furnace is also tapped to the exterior of the furnace, but some is left inside the furnace. Although part of the molten slag and part of the molten metal are left in the furnace, it is possible to supply the next heat of charged material to the furnace and repeat the same operation in this condition.

The molten metal enriched in platinum group elements taken out of the closed electric furnace separately from the molten slag can be transferred to an oxidizing furnace while still molten and subjected to treatment for enriching platinum group elements in the molten metal.

In the oxidizing furnace, the molten metal is oxidized while still in the molten state and the molten oxide (copper oxide) formed at the melt surface is discharged to the exterior of the furnace to leave molten metal that is further enriched in platinum group elements. Since almost no platinum group elements migrate to the molten oxide layer formed on the melt surface, they remain in the lower molten metal layer. The platinum group element concentration of the molten metal layer therefore rises every time the formed molten oxide layer is discharged. The oxidation in the oxidizing furnace can be favorably conducted by introducing oxygen gas or an oxygen-containing gas while maintaining a material temperature of 1100° C.-1700° C., preferably 1200° C.-1500° C. At a temperature below 1100° C., the molten oxide and/or molten metal solidifies to impede the progress of the oxidation. At a temperature above 1500° C., damage to the furnace body arises.

By repeating the oxidation and discharge of the oxide layer using the oxidizing furnace in this manner, the platinum group element content of the platinum group element-enriched molten metal layer can be raised to 10-75 wt %. After removal from the oxidizing furnace, the enriched molten metal is sent to a downstream platinum group element recovery and refinement step for separating and refining the metallic copper and platinum group elements.

The molten oxide layer (oxide composed primarily of copper oxide) discharged from the oxidizing furnace can be reused as the copper source material charged into the electric furnace. In this case, the oxide layer discharged from the oxidizing furnace in a molten state can be poured into water, i.e., be water-granulated, to obtain a copper source material containing not less than 50 wt %, preferably not less than 80 wt %, of granular material having a grain diameter of not less than 0.1 mm and not greater than 10 mm. After the water-granulated copper source material has been dried, it can be adjusted in grain size using a sieve or the like to obtain a copper source material of a granularity suitable for the process according to the present invention. The so-obtained copper source material entrains platinum group elements as impurities and the reuse thereof further enhances the recovery rate of the platinum group elements because the entrained platinum group elements also eventually transfer into the molten metal layer.

The present invention will now be further explained with reference to working examples.

EXAMPLE 1

Spent vehicle exhaust gas purification catalyst containing 1200 ppm of Pt, 450 ppm of Pd and 90 ppm of Rh (containing 36.5 wt % of $Al_2O_3$, 40.6 wt % of $SiO_2$, and 10.5 wt % of MgO) was granulated to a grain diameter of not greater than 10 mm and used as the substance to be processed. Copper oxide containing 80 wt % of granules of a grain diameter of not less than 0.1 mm and not greater than 10 mm (the balance being copper oxide lumps of a diameter exceeding 10 mm) was prepared as the copper source material. 300 kg of the copper source material containing these granules was mixed with 1000 kg of the substance to be processed. With the resulting mixture was further mixed with, as flux components, 600 kg of CaO, 200 kg of $Fe_2O_3$ and 400 kg of $SiO_2$, and, as reducing agent, 30 kg of coke.

The mixture was charged into a closed electric furnace like that shown in FIG. 1 and melted by heating to 1350°. At the time of charging the mixture, the electric furnace contained molten metal overlaid with molten slag remaining from the preceding run. The molten slag amounted to the ¼ of that in preceding run that remained after discharge of ¾ thereof.

After the mixture had been charged, the exhaust unit was operated to maintain the furnace interior at reduced pressure while the charge was being melted by heating to 1350° C. When the charged mixture floating on the slag surface had melted, the slag was sampled and found by analysis to contain 0.8 wt % of copper. About ¾ of the slag layer was therefore immediately discharged from the side of the electric furnace. After the discharged slag had cooled and solidified, it was analyzed for platinum group element content and found to contain 0.7 ppm of Pt, 0.1 ppm of Pd and 0.1 ppm of Rh. In other words, substantially all of the platinum group elements had transferred to the lower molten metal layer in the electric furnace.

EXAMPLE 2

Example 1 was repeated except that copper oxide containing 50 wt % of granules of a grain diameter of not less than 0.1 mm and not greater than 10 mm (the balance being copper oxide lumps of a diameter exceeding 10 mm) was used as the copper source material. As a result, the copper content at the time of slag discharge was 0.9 wt % and the amounts of platinum group elements therein were 0.9 ppm of Pt, 0.2 ppm of Pd and less than 0.1 ppm of Rh.

COMPARATIVE EXAMPLE 1

Example 1 was repeated except that 15 kg of coke powder was used as reducing agent. As a result, the copper content at the time of slag discharge was 3.2 wt % and the amounts of platinum group elements therein were 20 ppm of Pt, 12 ppm of Pd and 2 ppm of Rh.

COMPARATIVE EXAMPLE 2

Example 1 was repeated except that copper oxide containing 60 wt % of granules of a grain diameter of less than 0.1 mm (the balance being copper oxide of a grain diameter of not less than 0.1 mm) was used as the copper source material. As a result, the amounts of platinum group elements in the slag were 3.8 ppm of Pt, 1.2 ppm of Pd and less than 0.2 ppm of Rh.

COMPARATIVE EXAMPLE 3

Example 1 was repeated except that copper oxide containing 30 wt % of granules of a grain diameter of not less than 0.1 mm and not greater than 10 mm and the balance of 70 wt % of lumps of a diameter exceeding 10 mm was used as the copper source material. As a result, the amounts of platinum group elements in the slag were 4.2 ppm of Pt, 1.6 ppm of Pd and less than 0.2 ppm of Rh.

EXAMPLE 3

After the discharge of slag in Example 1, about ⅔ of the total amount of molten metal at the lower part of the electric furnace was tapped and charged into an oxidizing furnace while still molten. In the oxidizing furnace, oxygen-rich air having an oxygen concentration of 40% was blown onto the surface of the molten metal from a top lance. At the point where an oxide layer of approximately 1 cm thickness had formed on the surface of the molten metal, the furnace was tilted to pour the layer of oxide (copper oxide) out of the furnace into a water tank through which a large amount of water flowed.

The process of blowing oxygen-rich air onto the molten metal layer in the oxidizing furnace and tilting the furnace to pour the oxide into the water tank upon formation of an oxide layer of approximately 1 cm was repeated continuously. Later, the water-granulated oxide (substance composed mainly of copper oxide) was taken out of the water tank, dried, sampled, and measured for grain diameter and composition using sieves. It was found that 99 wt % of its constituent granules were of a grain diameter of not less than 0.1 mm and not greater than 10 mm.

EXAMPLE 4

The molten metal present at the lower part of the electric furnace following slag discharge in Example 2 was tapped and charged onto the molten metal remaining in the oxidizing furnace of Example 3 after the copper oxide had been poured out of the oxidizing furnace. When oxidation and water-granulation were then conducted in the manner of Example 3, it was found that 99 wt % of the constituent granules of the water-granulated oxide (substance composed mainly of copper oxide) were of a grain diameter of not less than 0.1 mm and not greater than 10 mm.

All of the molten metal present in the lower layer of the oxidizing furnace was taken out and solidified by cooling. 10 kg of the platinum group element-enriched metallic copper was sampled. The content ratios of the platinum group elements in the metallic copper were 23 wt % of Pt, 8.5 wt % of Pd and 1.5 wt % of Rh.

EXAMPLE 5

Example 1 was repeated except that the water-granulated oxide (substance composed mainly of copper oxide) obtained in Example 3 was used instead of the copper oxide of Example 1. The copper content at the time of slag discharge was 0.8 wt % and the amounts of platinum group elements in the obtained slag were 0.7 ppm of Pt, 0.1 ppm of Pd and less than 0.1 ppm of Rh.

As explained in the foregoing, the present invention enables platinum group elements to be recovered at a high recovery rate and with improved operational efficiency by a dry method that takes platinum group elements from a vehicle exhaust gas purification catalyst or other substance for processing that contains at least one platinum group element and concentrates them in molten metallic copper. It therefore enables economical and advantageous recovery of platinum group elements from spent resources.

The invention claimed is:

1. An apparatus for recovering platinum group elements comprising:
   a furnace body having an interior space substantially shut off from external air;
   a material charging port and an exhaust port provided in an upper half of the furnace body;
   at least two fluid discharge ports provided in a lower half of the furnace body at different height levels;
   a material charging chute connected to the material charging port;
   an exhaust unit connected to the exhaust port; and
   electrodes for passing electric current through and heating material charged into the furnace,
   wherein charged material including oxide-based starting material entraining at least one platinum group element, copper oxide, solid reducing agent and flux is melted in the furnace under a reducing atmosphere substantially shut off from external air while operating the exhaust unit to discharge gas generated in the furnace, metallic fluid of high platinum group element concentration is taken out from the low-level fluid discharge port and slag-like fluid of low platinum group element concentration is taken out from the high-level fluid discharge port;
   wherein the material charging chute is equipped with a shutter so as to maintain airtightness when material is charged into the interior space of the furnace, and further wherein the shutter is a vertical two-stage shutter comprising an upper stage shutter and an lower stage shutter, wherein the upper stage shutter is open and the lower stage shutter is closed when a single batch of the material is charged into the material charging chute, and further wherein the upper stage shutter is then closed and the lower stage shutter is opened to charge the batch resident in the chute into the furnace, and, when the charging of the batch into the furnace has been completed, the upper and lower shutters and are closed in preparation for the next charging operation.

2. An apparatus for recovering platinum group elements according to claim 1, wherein the closed electric furnace is charged with a mixture of a granular substance to be treated containing starting materials of at least one platinum group element, a granular copper source material containing copper oxide, a powdery reducing agent, and powdery flux, wherein the starting materials are dispensed in measured amounts from respective hoppers and fed into the material charging chute while being conveyed into the electric furnace with mixing by a screw conveyor.

3. An apparatus for recovering platinum group elements according to claim 1, further comprising a diverging member mounted at a lower portion of the material charging chute, the diverging member directing material falling into the furnace outwardly from an end of the material charging chute.

* * * * *